(12) United States Patent
Bertani

(10) Patent No.: US 6,871,445 B2
(45) Date of Patent: Mar. 29, 2005

(54) COLLECTING-CONTAINER FOR INSECTICIDE APPARATUS AND AN APPARATUS FOR CAPTURING INSECTS AND THE LIKE PROVIDED WITH SUCH A CONTAINER

(75) Inventor: Carlo Bertani, Montechiarugolo (IT)

(73) Assignee: MO-EL S.r.l., Montecchio Emilia (IT)

( * ) Notice: Subject to any disclaimer, the term of this patent is extended or adjusted under 35 U.S.C. 154(b) by 0 days.

(21) Appl. No.: 10/480,869

(22) PCT Filed: Jun. 4, 2002

(86) PCT No.: PCT/IT02/00363

§ 371 (c)(1),
(2), (4) Date: Dec. 16, 2003

(87) PCT Pub. No.: WO02/102146

PCT Pub. Date: Dec. 27, 2002

(65) Prior Publication Data

US 2004/0148848 A1 Aug. 5, 2004

(30) Foreign Application Priority Data

Jun. 18, 2001 (IT) .................... MI2001A1276

(51) Int. Cl.⁷ .............................................. A01M 1/08
(52) U.S. Cl. ....................................................... 43/139
(58) Field of Search .......................................... 43/139

(56) References Cited

U.S. PATENT DOCUMENTS

| | | | | | |
|---|---|---|---|---|---|
| 1,807,550 | A | | 5/1931 | Rector | |
| 4,127,961 | A | * | 12/1978 | Phillips | 43/139 |
| 4,332,100 | A | * | 6/1982 | Schneider | 43/113 |
| 4,630,329 | A | * | 12/1986 | Shores | 15/368 |
| 4,979,330 | A | * | 12/1990 | Rorant | 43/139 |
| 5,157,865 | A | | 10/1992 | Chang | |
| 5,367,821 | A | * | 11/1994 | Ott | 43/139 |
| 5,813,166 | A | * | 9/1998 | Wigton et al. | 43/107 |
| 6,145,243 | A | * | 11/2000 | Wigton et al. | 43/139 |
| 6,202,343 | B1 | | 3/2001 | Mah | |
| 6,286,249 | B1 | * | 9/2001 | Miller et al. | 43/139 |
| 6,594,946 | B2 | * | 7/2003 | Nolen et al. | 43/114 |
| 6,675,528 | B2 | * | 1/2004 | Jablin | 43/139 |
| 6,718,685 | B2 | * | 4/2004 | Bossler | 43/107 |

FOREIGN PATENT DOCUMENTS

| | | |
|---|---|---|
| DE | 298 21 790 U1 | 2/1999 |
| EP | 0 746 977 A1 | 12/1996 |
| FR | 2 741 807 | 6/1997 |

* cited by examiner

Primary Examiner—Michael J. Carone
Assistant Examiner—Bethany L. Griles
(74) Attorney, Agent, or Firm—Pearne & Gordon LLP

(57) ABSTRACT

A collecting container (1) for insecticide apparatus (2) comprises a base wall (9), side walls (10) extending transversely of the base wall (9) and an upper wall (11) engaging the tops of the side walls (10) and in which an access opening (13) is formed for entry of the insects captured by the apparatus itself. In engagement at the access opening (13) is a rocking element (16) movable in rotation for closing and/or opening the access opening depending on the air circulation within the apparatus (2). The rocking element (16) operates at the inside of a surface recess (14) formed in the upper wall (11) and has an obstruction portion (16b) directly active on the access opening (13) to close and/or open the latter and a counter-weight (16c) isolated from the air- and insect-passage region (14a) by a partition (17) located within the surface recess itself.

12 Claims, 4 Drawing Sheets

COLLECTING-CONTAINER FOR INSECTICIDE APPARATUS AND AN APPARATUS FOR CAPTURING INSECTS AND THE LIKE PROVIDED WITH SUCH A CONTAINER

The present invention relates to a collecting container for insecticide apparatus, of the type comprising the features set out in the preamble of claim 1.

The invention also relates to an apparatus for capturing insects and the like comprising the features set out in the preamble of claim 8.

The invention addresses to devices and/or apparatus set to capture and possibly eliminate flying insects. In more detail, the present invention lends itself to be used on an apparatus for capturing insects and the like of the type described in document EP 0 746 977 in the name of the same Applicant. This apparatus comprises a holding casing within which at least one main suction duct is defined which has an inlet which is coincident with an opening formed in a front portion of the casing, and an outlet represented by a series of openings formed through a rear wall of the casing itself. A fan to be driven in rotation for generating a continuous air stream between the inlet and outlet is present in the main suction duct. Close to the inlet, one or more light elements are set for attracting the insects that are thus drawn in through the main suction duct. Interposed between the fan and the outlet is a filter for retention of the sucked insects that, through an appropriate vertical connecting passage, reach a collecting region defined on the lower part of the filter itself. Removably located in the collecting region is an extractable collecting container having an access opening facing the connecting passage and through which insects are conveyed to the collecting container itself.

Within the holding casing, on the upper part of the connecting passage, closing means is further arranged for closing and/or opening of the connecting passage. The closing means is designed to open the connecting passage due to the thrust exerted by the air stream from the fan and to close said passage when the apparatus is turned off and the air stream is stopped. In detail, the closing means consists of a pair of balancing or rocking elements disposed opposite to each other. Each rocking element is hinged internally of the holding casing and has an active obstruction portion on the connecting passage to close and/or open said passage and a counterweight disposed on the opposite side with respect to the obstruction portion to move the rocking element to the original position when the air stream is stopped.

A similar insecticide apparatus comprising a collecting region where is defined a collecting container for trapping insects sucked by a fan, is disclosed in the document U.S. Pat. No. 1,807,550. In particular, the collecting container is defined by a base wall, a cylindrical side wall extending engaged at the opposite side with respect the base wall. The closing means is open by the air flow generated by the fan and closed by the action of a spring or a counterweight.

The Applicant has found that apparatus of the above described type can be improved under different points of view, mainly in connection with insect capturing and also as regards insect maintenance within the collecting container and safety of the person carrying out insect removal and cleaning of the collecting container.

In fact, in known apparatus, the insects present in the collecting container tend to climb up to the access opening which they enter and to occupy the existing spaces between the collecting container and the casing walls at the collecting region, as well as at the lower part of the connecting duct.

When extraction of the collecting container is carried out, the insects present in the collecting region are free to fly out of the holding casing with a risk of the operator being possibly stung.

The Applicant has also found that the sucked insects tend to occupy the space defined between the connecting passage and the counterweights of the rocking elements which will impair mobility of the latter. Under this situation, it is possible that the rocking elements should stay in an open condition even during inactivity of the apparatus so that the captured insects can fly out. It will be also recognized that if the collecting container is extracted from the holding casing when the rocking elements are in an open condition, said elements are inevitably damaged.

The Applicant has further found that these apparatus can also be improved in terms of structural bulkiness and production and sale costs.

It is an aim of the present invention to solve the problems found in the known art by proposing a collecting container for insecticide apparatus and an insect-capturing apparatus ensuring trapping of the insects and avoiding escape of same.

It is a further aim of the invention to make these apparatus cheaper and more compact.

The foregoing and further aims that will become more apparent in the course of the following description are substantially achieved by a collecting container for insecticide apparatus comprising the features set out in the characterizing portion of claim 1 and by an apparatus for capturing insects and the like provided with such a container.

Further features and advantages will be best understood from the detailed description of a preferred but not exclusive embodiment of a collecting container for insecticide apparatus and an apparatus for capturing insects and the like provided with such a container, in accordance with the present invention. This description will be taken hereinafter with reference to the accompanying drawings, given by way of non-limiting example, in which.

Figure 1:
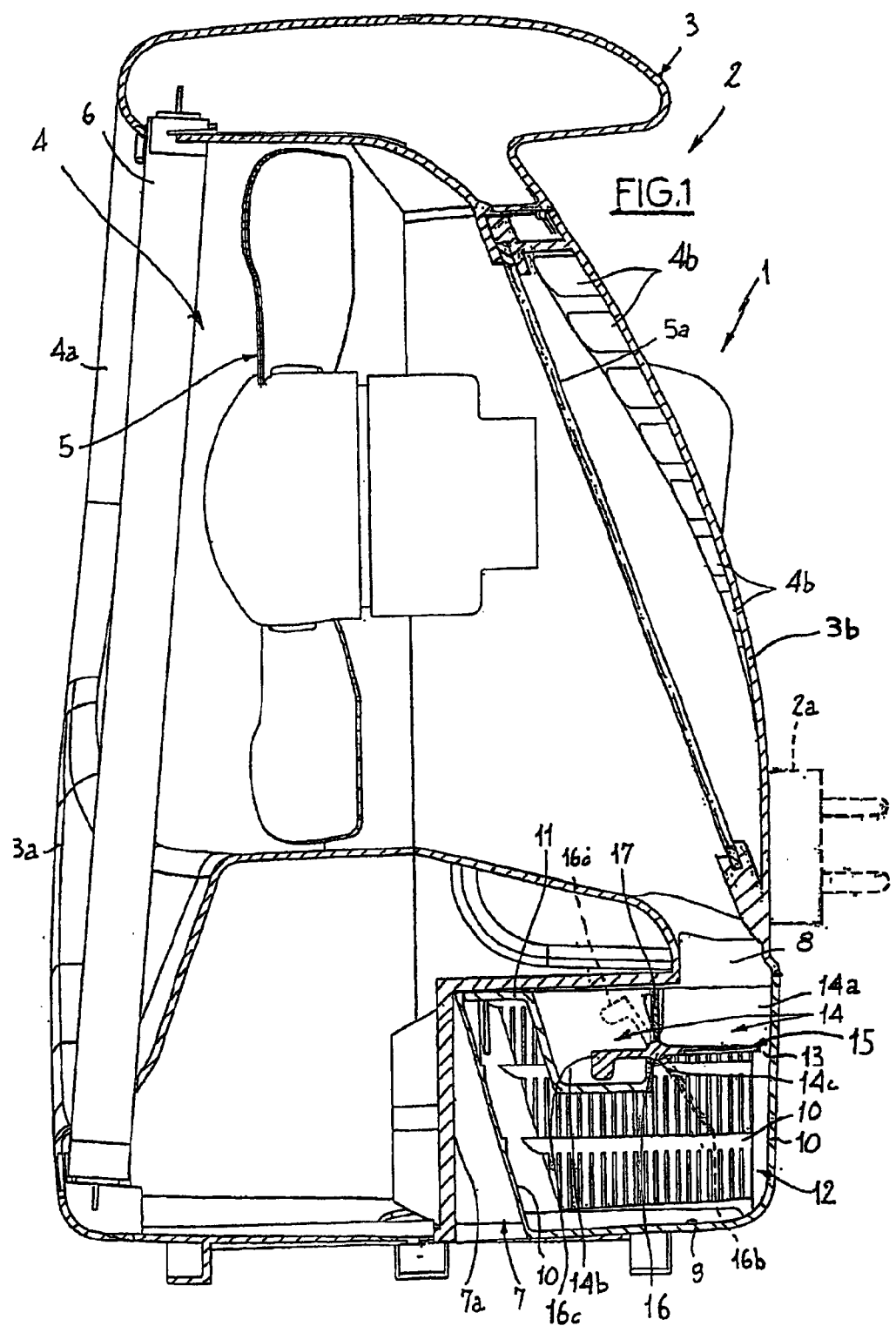
FIG. 1 is a section of an insect-capturing apparatus provided with a collecting container, in accordance with the present invention.

With reference to the drawings, a collecting container for insecticide apparatus in accordance with the present invention has been generally identified by reference numeral 1.

As shown in FIG. 1, an apparatus for capturing insects and the like comprises a holding casing 3 within which at least one main suction duct 4 is defined which has at least one inlet 4a, formed through a front wall 3a of the holding casing and at least one outlet 4b, defined by a series of openings for example, that are formed through a rear wall 3b of the holding casing 3. Operatively active within the main suction duct 4 is a suction means 5 for generating an air stream between the inlet 4a and outlet 4b. In detail, the suction means 5 preferably consists of an axial fan 5 adapted to be driven in rotation.

Also disposed on the front wall 3a of the holding casing 3 is one or more light elements 6 set to attract the surrounding insects close to the inlet 4a of the main suction duct 4, and draw them into the holding casing 3.

A reticular filter 5a may be also provided between the suction fan 5 and outlet 4b and it is set to retain the insects drawn in through inlet 4a and convey them to a collecting region 7 defined at the lower part thereof by a recess 7a formed in the holding casing 3. In addition, the main suction duct 4 and collecting region 7 are in fluid communication with each other through a connecting passageway 8 so that at least part of the air circulating within the main suction duct 4 is diverged to the collecting region and is allowed to go back to the surrounding atmosphere through slits 1a provided in the collecting container 1.

Still with reference to FIG. 1, the collecting container 1 is insertable in the recess 7a of the collecting region 7 and can be brought into engagement with the holding casing 3 through appropriate mechanical-connection means (not shown) so that the collecting container 1 defines the collecting region itself at least partly.

In detail, the collecting container 1 comprises a base wall 9 from which side walls 10 peripherally stand up, said walls terminating, at the top, against an upper wall 11 opposite to the base wall 9. The side walls 10 are of one piece construction, by a moulding process for example, with the base wall 9, whereas the upper wall 11 is advantageously removably in engagement with the side walls 10 thereby making cleaning of the collecting container 1 easier and quicker since the latter lends itself to be suitably disassembled. Note that container 1 and more specifically the container base wall 9 and/or side walls 10 can be embodied by a basket pierced with holes on all sides or a bag of reticular structure.

When the upper wall 11 is applied to the side walls 10 it defines a collecting space 12 with said side walls 10 and base wall 9; the insects captured by suction of the axial fan 5 are trapped inside said collecting space 12. The insects are conveyed to the collecting container 1 by the air stream through an access opening 13 formed in the upper wall 11 of the collecting container itself.

As shown in the accompanying figures, the access opening 13 is formed at an offset position with respect to a longitudinal axis "X" of the collecting container 1 and, preferably, it is at least partly bounded by one of the side walls 10 of the collecting container itself. When the collecting container 1 is mounted on the holding casing 3 of apparatus 2, the access opening 13 as shown in FIG. 1 faces the passageway 8 connecting the collecting region 7 to the main suction duct 4.

Figure 2:
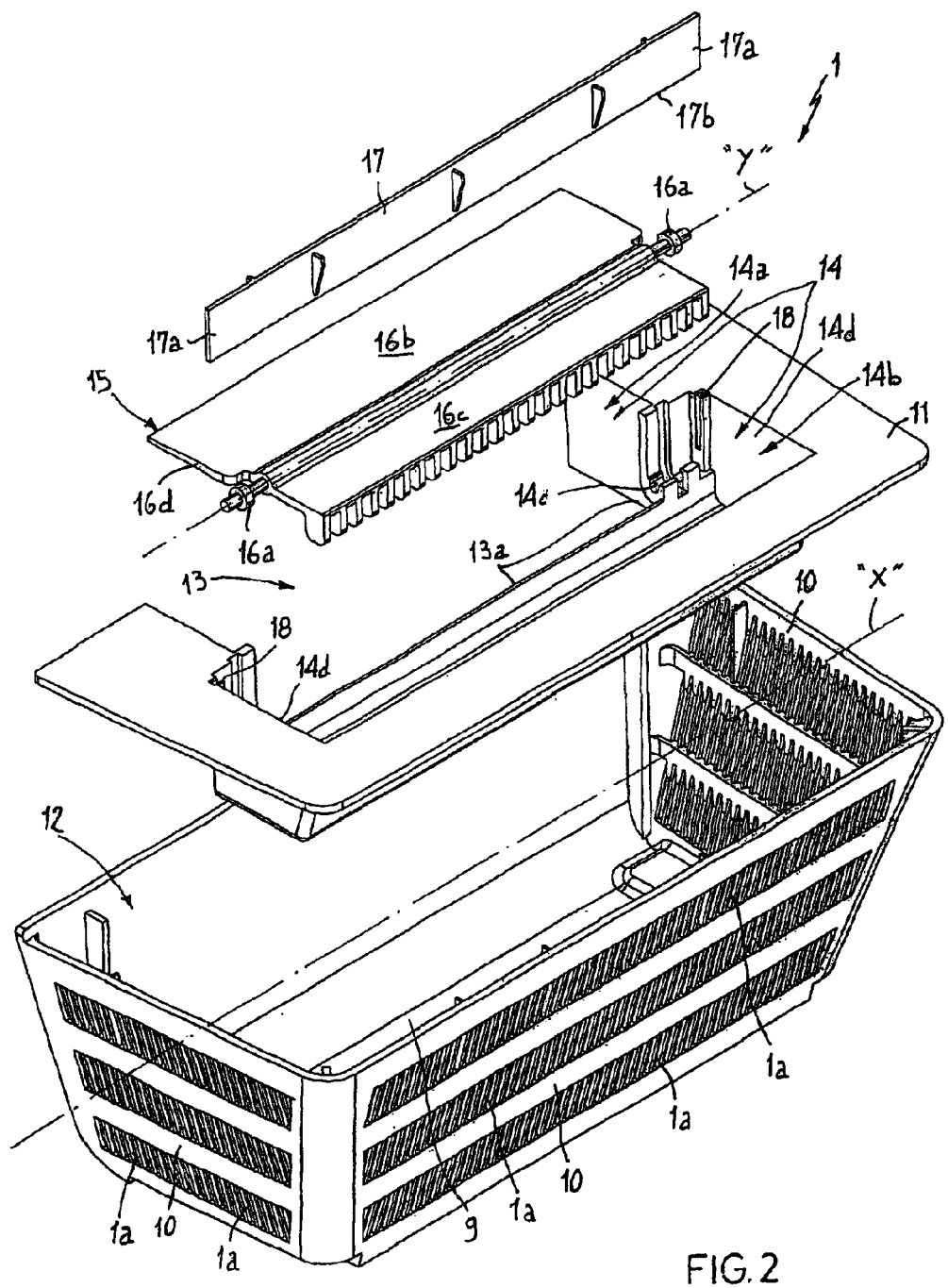
FIG. 2 is an exploded perspective view of the collecting container of the apparatus referred to in FIG. 1.

With reference to FIG. 2, the access opening 13 is disposed in a surface recess 14 formed in the upper wall 11 of the collecting container 1. The surface recess 14 has an irregular shape in which regions 14a, 14b of differentiated lengths can be identified. A first region 14a intended for passage of air and the captured insects, is disposed close to the above mentioned side wall 10 and houses the access opening 13. A second region 14b is on the contrary separated from the air passage, as described in the following, by a component of the collecting container 1 so as to ensure correct operation thereof.

As shown in the drawings, the closing means 15 is operatively located at least partly within the surface recess 14 and, preferably, is fully disposed therein.

The closing means 15 comprises at least one balancing or rocking element 16 rotatably in engagement with respective hinging seats 14c formed in the surface recess 14 of the upper wall 11, through a pair of hinging pins 16a jutting out of the rocking element from opposite sides thereof. More specifically, the hinging pins 16a of the rocking element 16 interact with the respective hinging seats 14c of the surface recess 14 to give the rocking element the ability to rotate about a rotation axis "Y" coincident with the longitudinal axes of the hinging pins 16a. The rocking element 16 therefore is free to rotate between a first position at which the access opening 13 is closed and a second position at which the access opening 13 is at least partly open.

Opening and/or closing of the access opening 13 is carried out by the rocking element 16, by means of at least one obstruction portion 16b carried by the last-mentioned element. Preferably, the obstruction portion 16b of the rocking element 16 is substantially flat and it conforms in shape to the access opening 13, so that when the rocking element 16 is in the first position, a peripheral edge 16b of the obstruction portion 16b extends close to a respective peripheral edge 13a of the access opening. In other words, in the closing condition of the rocking element 16, the peripheral edge 16d of the obstruction portion 16b of said element slightly touches the peripheral edge 13a of the access opening 13.

Advantageously, the flat conformation and particularly the extended shape of the obstruction portion 16b makes the action exerted by the air reaching the first region 14a of the surface recess 14 particularly efficient; it pushes the obstruction portion 16b towards the collecting space 12 of the collecting container 1 thereby causing rotation of the rocking element 16 about axis "Y". The rocking element 16 therefore moves from its original position, i.e. the first position, to the second position disengaging the access opening 13 and consequently causing opening of same.

In order to ensure closure of the collecting container 1 during inactivity of apparatus 2 and maintenance of the captured insects therein, the rocking element 16 further comprises at least one counterweight disposed on the opposite side with respect to the obstruction portion 16b; counterweight 16c acts against movement of the rocking element 16 from the first to the second position. However, counterweight 16c generates with respect to the rotation axis "Y", a moment of lower intensity than the moment produced by the thrust action of the air stream circulating in the connecting passageway 8. Therefore, the counterweight action is only efficient when the air stream is stopped. Under this situation, counterweight 16c brings the rocking element 16 to the first position so that the latter closes the access opening 13 of the collecting container 1 by its obstruction portion 16b.

Figure 3:
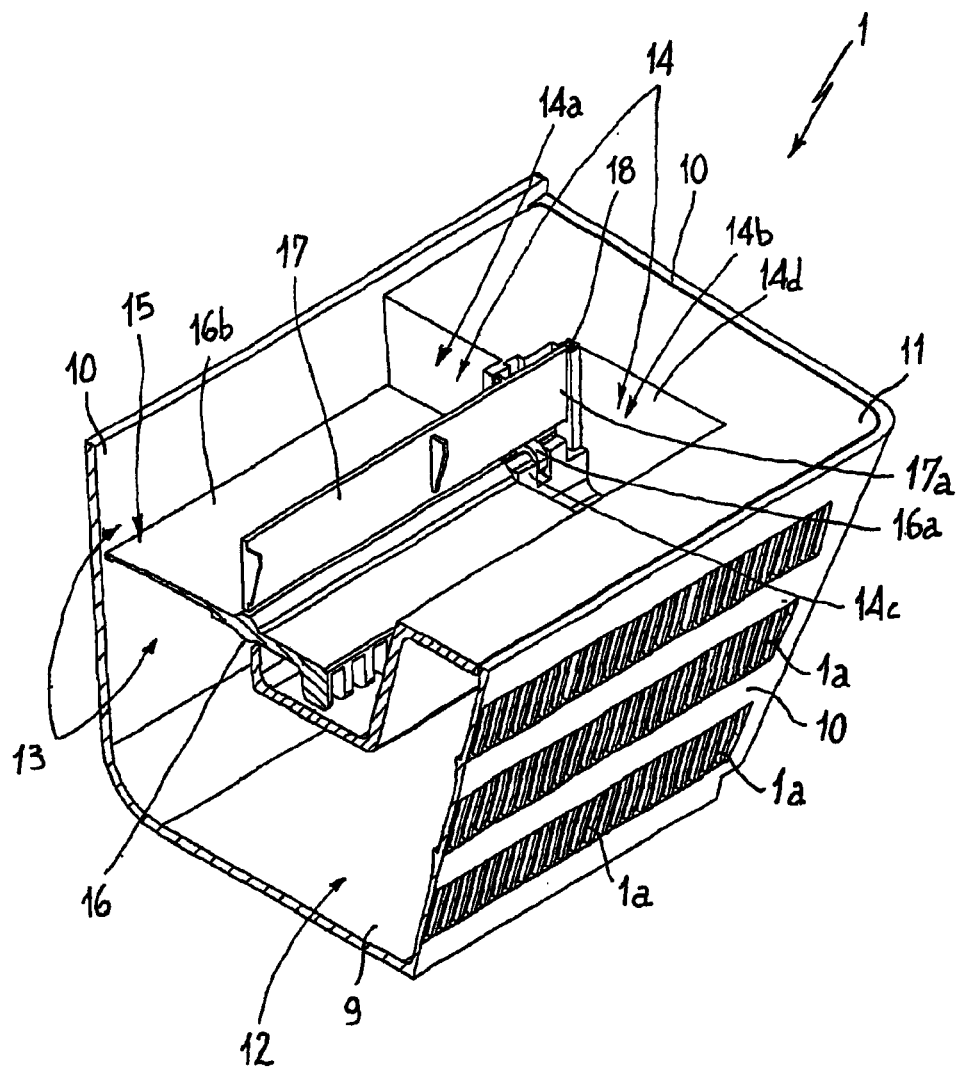
FIG. 3 is a fragmentary perspective view of the collecting container shown in the preceding figures.
Figure 4:
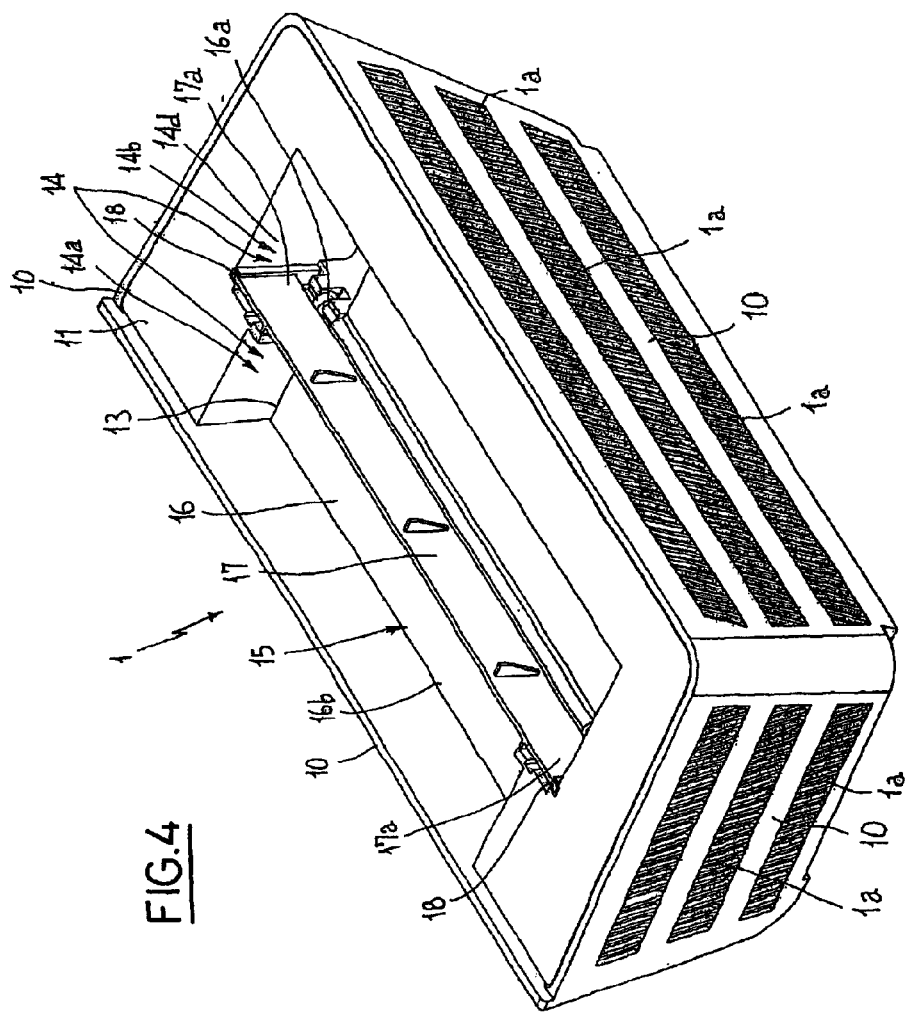
FIG. 4 is a further perspective view of the collecting container in accordance with the invention.

As shown in FIGS. 2 to 4, the obstruction portion 16b and counterweight 16c substantially extend in the same lying plane from the first region 14a to the second region 14b of the surface recess 14 of the upper wall 11.

Advantageously, within the surface recess 14 and at a higher position with respect to the rocking element 16 a partition 17 is insertable; it clearly separates the first region 14a of recess 14 from the second region 14b. As shown in FIGS. 3 and 4, partition 17 by its ends 17a engages respective engagement seats 18 formed in opposite surfaces 14d of the surface recess and, by a lower edge 17b thereof it engages the rocking element 16 along the rotation axis "Y" between the obstruction portion 16b and counterweight 16c. In this way, the presence of partition 17 prevents insects from moving from the second region to the first region. In fact, partition 17 does not allow insects to occupy the counterweight region 14b since this region is isolated from the first region 14a of the surface recess. The air from the underlying main suction duct is therefore exclusively addressed to the access opening 13 of the collecting container 1 thereby ensuring correct operation of the rocking element 16 that therefore can move from the first to the second positions and vice versa depending on the action of the air stream and of counterweight 16c.

As shown in the accompanying figures, a plurality of slits 1a is formed through the structure of the collecting container 1 to enable the air entering the access opening 13 of the container itself and the holding casing 3 of apparatus 2. These slits 1a have suitable sizes to enable air venting while retaining the captured insects, and they are formed through the side walls 10.

In order to increase thrust exerted by air on the rocking element 16, the rear wall 3b of the holding casing 3 may be completely closed so that the air stream generated by fan 5 is fully conveyed to the collecting region 7 of the holding casing 3 strongly impinging on the rocking element 16 and subsequently leaving the collecting container 1 through the through openings 1a. Under this situation, since the whole air stream is directed against the obstruction portion 16b of the rocking element 16, the latter may be provided with a heavier and more efficient counterweight in relation to the returning action of the rocking element from the second to the first positions, which counterweight however must not inhibit the air stream action.

In addition, apparatus 2, in the case of compact models, may be equipped with an electric connector 2a integral with the holding casing 3 and giving the apparatus the possibility of being directly applied to a common electric socket without the aid of external electric cables.

Operation of the collecting container 1 and apparatus 2 described above mainly as regards structure is as follows.

When apparatus 2 is turned on, fan 5 is driven in rotation concurrently with switching on of the light elements 6. Fan 5 generates an air stream between the inlet 4a and outlet 4b and the insects attracted to the inlet itself are drawn into the main suction duct 4. Part of the air stream comes out of outlet 4b, whereas another part moves towards the collecting passage 8 carrying the sucked insects to the collecting region 7 and impinging on the rocking element 16. In more detail, the air from the main suction duct 4 directly acts on the obstruction portion 16b of the rocking element 16 pushing the latter towards the collecting space 12. The rocking element 16 consequently rotates about axis "Y" opening the access opening 13 of the collecting container 1. The drawn in insects are then conveyed to the collecting space 12 of the collecting container 1 within which they die due to the dehydrating action of the circulating air.

Once apparatus 2 has been turned off and the air stream between the inlet 4a and outlet 4b has been stopped, the rocking element 16 goes back to the first position upon the action of counterweight 16c that cannot be hindered at all by one or more insects because the partition ensures perfect isolation of said counterweight from the insect-passage region, said insects irremediably reaching the collecting space 12. At this point the collecting container 1 can be safely removed from the holding casing 3 so as to extract the insects from the collecting space 12, after disengagement of the upper wall 11 together with the rocking element 16 and partition 17, and the container itself can be cleaned.

The present invention solves the problems found in the known art and achieves the intended purposes.

First of all, the present invention enables flying insects of any type to be efficiently captured keeping them entrapped within the collecting container 1, even during inactivity of apparatus 2. More particularly, due to the configuration of the collecting container 1 and closing means 15 and the presence of partition 17, closure of the access opening 13 is always ensured when apparatus 2 is in an inactive condition so that the insects are inhibited from coming out of the collecting container through the access opening 13. In addition, partition 17 isolates region 14b where the counterweight 16c of the rocking element 16 operates from region 14a dedicated to passage of air and insects, while in known apparatus said insects entered an area between the counterweights of the rocking elements and the holding casing in order to protect themselves from the air stream, thereby impairing a correct operation of the rocking elements themselves that kept an open condition.

In accordance with the present invention, the counterweight 16c of the rocking element 16 on the contrary is not at all concerned with the captured insects and therefore it can operate in a correct manner.

It should be also recognized that the collecting region 7 of apparatus 2 in accordance with the invention is defined by the collecting container 1 ensuring entrapping of the captured insects as above specified. Therefore, during extraction of the collecting container 1 from the holding casing 3, the user does not any longer run the risk of being stung by possible insects installed between the collecting region 7 and collecting container 1 as in the known art.

In addition, the collecting container as conceived enables apparatus 2 to be made in a very compact manner and said apparatus can be even produced in miniaturized versions to be directly applied to common electric outlets or sockets. Reduction and simplification in the structural sizes of apparatus 2 enables costs for the apparatus manufacture to be greatly reduced as well.

What is claimed is:

1. A collecting container for insecticide apparatus comprising: a base wall (9); side walls (10) extending from said base wall (9); at least one upper wall (11) engaging said side walls (10) on the opposite side with respect to said base wall (9) and defining a collecting space (12) for insects and the like together with said base (9) and side (10) walls; at least one access opening (13) formed through said upper wall (11) of said collecting container (1) for entry of said insects and the like into said collecting space (12); a closing means (15) operatively associated with said access opening (13) to close and/or open the access opening, said closing means (15) comprising at least one balancing or rocking element (16) rotatably in engagement with said upper wall (11) and movable between a first position at which said access opening (13) is closed and a second position at which said access opening (13) is open, characterized in that said closing means (15) is operatively located at least partly in a surface recess (14) provided in said upper wall (11), said access opening (13) being formed in said surface recess (14).

2. A container as claimed in claim 1, wherein said rocking element (16) has: at least one obstruction portion (16b) active on said access opening (13) to open and/or close the latter; at least one counterweight (16c) disposed on the opposite side from said obstruction portion (16b) to bring said rocking element (16) to the first position.

3. A container as claimed in claim 1, wherein said closing means (15) is fully, disposed within said surface recess (14).

4. A collecting container as claimed in claim 2, wherein said obstruction portion (16b) and counterweight (16c) substantially extend in the same lying plane.

5. A collecting container as claimed in claim 2, wherein said obstruction portion (16b) conforms in shape to the access opening (13) so that when said rocking element (16) is in the first position a peripheral edge (16d) of said obstruction portion (16b) extends close to a peripheral edge (13a) of said access opening (13).

6. A collecting container as claimed in claim 2, further comprising at least one partition (17) to be located in said surface recess (14) to define a first region (14a) therein terminating at the access opening (13) and intended for insect passage, as well as a second region (14b) in which said counterweight (16c) operates, said partition (17) being of such a shape and being such positioned that insect passage to the first region is prevented.

7. A container as claimed in claim 1, wherein a plurality of through openings (1a) are formed for air passage through at least one of the walls (9, 10) of said collecting container (1).

8. An apparatus for capturing insects and the like comprising: a holding casing (3) defining at least one main suction duct (4) having at least one inlet (4a) and at least one outlet (4b); suction means (5) operating in said main suction duct (4) and set to define an air stream between said inlet (4a) and outlet (4b) to draw insects and the like into the apparatus; a collecting region (7) located between said inlet (4a) and outlet (4b) and set to receive said sucked insects and the like, at least one collecting container (1) removably engaged in said holding casing (3) at said collecting region of the casing itself; wherein the collecting container comprises: a base wall (9); side walls (10) extending from said base wall (9); at least one upper wall (11) engaging said side walls (10) on the opposite side with respect to said base wall (9) and defining a collecting space (12) for insects and the like together with said base (9) and side (10) walls; at least one access opening (13) formed through said upper well (11) of said collecting container (1) for entry of said insects and the like into said collecting space (12); a closing means (15) operatively associated with said access opening (13) to close and/or open the access opening, said closing means (15) comprising at least one balancing or rocking element (16) rotatably in engagement with said upper wall (11) and movable between a first position at which said access opening (13) is closed and a second position at which said access opening (13) is open, wherein said closing means (15) is operatively located at least partly in a surface recess (14) provided in said upper well (11), said access opening (13) being formed in said surface recess (14).

9. An apparatus as claimed in claim 8, wherein on the opposite side from said inlet (4a), said holding casing (3) has a closed rear wall (3b), said rear wall (3b) partly defining said main suction duct (4) so that the air stream generated by said suction means (5) is diverged by said rear wall (3b) to said collecting region (7).

10. An apparatus as claimed in claim 9, wherein said rocking element (16) is movable from the first to the second positions upon the action of said air stream, and said counterweight (16c) is set to move said rocking element (16) from the second to the first positions in the absence of said air stream.

11. An apparatus as claimed in claim 8, wherein rigidly in engagement with said holding casing (3) is an electric socket for connection of the apparatus (2) to a power supply line.

12. An apparatus as claimed in claim 8, wherein a partition (17) extends from the surface recess (14) of said upper wall to an upper wall of said collecting region (7) to isolate the second region (14b) of the surface recess (14) and the counterweight (16c) of the rocking element (16) from the air stream generated by the suction means (5) and convey this air stream to the access opening (13).

* * * * *